April 17, 1956 V. M. HAYWOOD ET AL 2,742,638

RADIO RANGING SYSTEM

Original Filed Jan. 5, 1952 2 Sheets-Sheet 1

INVENTOR
VERNON M. HAYWOOD
ROBERT L. CAYOUETTE
HOWARD C. TURNAGE

BY Cushman, Darby & Cushman

ATTORNEYS

April 17, 1956 V. M. HAYWOOD ET AL 2,742,638

RADIO RANGING SYSTEM

Original Filed Jan. 5, 1952 2 Sheets-Sheet 2

INVENTOR
VERNON M. HAYWOOD
ROBERT L. CAYOUETTE
HOWARD C. TURNAGE
BY Cushman, Darby & Cushman
ATTORNEYS United States Patent Office 2,742,638

Patented Apr. 17, 1956

2,742,638

RADIO RANGING SYSTEM

Vernon M. Haywood, Robert L. Cayouette, and Howard C. Turnage, Hampton, Va.

Original application January 5, 1952, Serial No. 265,116. Divided and this application June 25, 1954, Serial No. 440,652

4 Claims. (Cl. 343—12)

This invention relates to radio ranging systems. More particularly, the invention relates to such systems which are based upon phase comparison of beat frequencies developed from carrier frequencies separated by a relatively low frequency such as an audio tone.

This application is a division of our copending application Serial No. 265,116, filed January 5, 1952, now Patent 2,709,253.

In the past, radio ranging systems of the above mentioned type have been very successfully employed in which a pair of transmitters is used, both transmitters of the pair being tuned to operate in the same channel but separated in frequency by an audio tone, with one transmitter at a first or fixed station and the other at a second or mobile station. Those systems further employ a pair of receivers, one located at the first station and the other at the second station, the receivers each being tuned to receive transmissions from both of the transmitters to detect the audio tone as a beat frequency. A return link is then customarily provided from one station to the other to relay the beat frequencies to a common point which is usually, but not necessarily, at one or the other of the stations. So arranged, the known systems provide an extremely accurate method of ranging. As an example, one system which has been widely used is fully described and claimed in United States Patent 2,528,141, patented October 31, 1950, to Charles E. Hastings. Referring particularly to the "elliptical" ranging systems described in that patent, it is clear that when the spacing between the transmitter and receiver at each station is small concerned with the distance between stations, the elliptical paths of constant beat frequency phase substantially become circles and the system remains sensitive to range, but becomes insensitive to direction.

However, in systems as described in the above mentioned patent, where the antennas of the transmitter-receiver combination must be extremely close together (as on an aircraft, for example), as the stations move apart the ratio of the two signals at the receiver antenna becomes the limiting factor in the range of operation. In other words, with the transmitter arranged to transmit sufficient power so that the signal may be picked up at the other station, the adjacent receiver is "swamped" by the transmitter.

The primary object of the present invention is to overcome the above difficulties. Briefly stated, the present system is as above described in the use of a separate frequency for each transmitter-receiver combination. Preferably, one frequency will differ by a relatively low frequency from being a harmonic of the other frequency. Further distinction over the above system also lies in providing for lane identification by use of a differential device connected with integrating phasemeters tied in with systems operating on slightly different frequencies.

The problem of separating the transmitting and receiving antennas has been done away with so completely in systems according to the present invention that a transmitter, receiver and return link transmitter have been operated from a single antenna.

It is therefore a further object of this invention to provide a radio ranging system relying on comparison of phase angle of beat frequencies which will accurately measure distances between stations over very great ranges and yet permit an absolute minimum of separation of transmitter and receiver units at either or both stations.

It is a further object of this invention to provide a system as mentioned in the preceding paragraph in which available harmonic and sub-harmonic radiations of transmitters will be employed to "separate" the transmission channels and yet provide excellent means for comparing beat frequency phase angles to indicate range.

It is a further object of this invention to provide a radio ranging system in which a ranging frequency is employed as a return link.

It is a further object of this invention to provide lane identification in radio ranging and navigation systems by use of slightly different frequencies and in which integrating phasemeters connected with a differential indicating device may be employed.

Further objects and the entire scope of the invention will become more fully apparent from the following detailed description and from the appended claims.

The invention may be best understood with reference to the accompanying drawings, in which.

The detailed description of the various aspects of the present invention will proceed with reliance upon certain frequencies and certain harmonics in order to provide a clear understanding of the principles of the invention. However, it will be understood throughout this description that other frequencies and other harmonics may be employed without exceeding the scope of the present invention.

Figure 1:
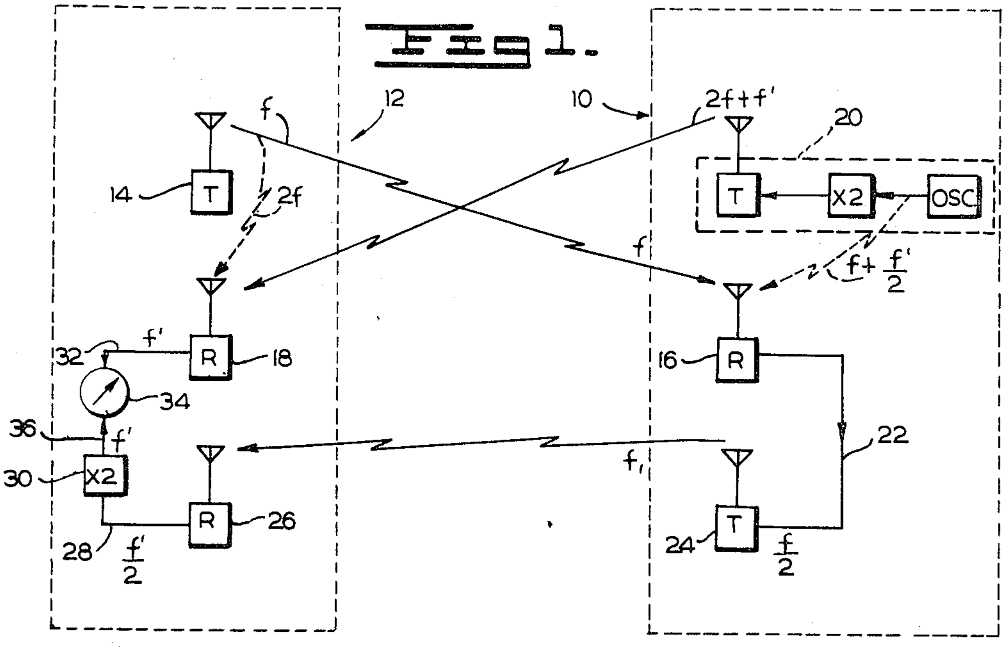
Figure 1 shows an example of a basic system according to the present invention.

Referring now to Figure 1, 10 generally designates a first station and 12 generally designates a second station. Either of these stations may be fixed or movable as desired. All that is involved in the system is the measurement of absolute range between the two stations. A transmitter 14 on frequency $f$ is located at station 12. Transmitter 14 will have sufficient power to provide a signal at receiver 16 at station 10 of frequency $f$ and will also produce a small amount of second harmonic $2f$ which will be picked up by a receiver 18 at station 12.

At station 10 there is a transmitter 20 operating on $2f$ plus an audio tone $f^1$. Transmitter 20 may be of the well known type which uses a crystal oscillator operating on one-half of the output frequency, which in this case will be $$f+\frac{f^1}{2}$$

and a small amount of this frequency will unavoidably be radiated. As an example of operating values $f^1$ may be 400 C. P. S. and $f$ may be between 2 and 6 magacycles.

Receiver 16 tuned to frequency $f$ will detect a heat frequency $$\frac{f^1}{2}$$

by reason of receiving the frequency $f$ from transmitter 14 and frequency $$f+\frac{f^1}{2}$$

from transmitter 20. This beat frequency will be applied over a line 22 to a transmitter 24, preferably frequency modulated, which will relay the beat frequency at a return link frequency $f_1$ to a receiver 26 at station 12. Receiver 26 will detect the beat frequency $$\frac{f^1}{2}$$

and this frequency will be applied over a line 28 to a frequency doubler circuit 30. The output of circuit 30 will then be the frequency $f^1$. Concurrently, receiver 18 at station 12 will detect a beat frequency $f^1$ by reason of receiving frequency $2f$ from transmitter 14 and frequency $2f+f^1$ from transmitter 20. Frequency $f^1$ from receiver 18 will be applied over line 32 to one input of an integrating phase meter 34, and the frequency $f^1$ from doubler circuit 30 will be applied to the other input of this phasemeter over line 36. Accordingly, it will be clear that as the distance between stations 10 and 12 is changed, either by increasing or decreasing the distance, the phase angle between the beat frequencies $f^1$ on line 32 and line 36 respectively will change and the phasemeter 34 will operate accordingly. This follows from the following mathematical analysis:

Designating the distance between the stations 10 and 12 by $r$ and employing other symbols as follows:

$c$—velocity of radio waves over operating terrain.
W—wave length at $f$.
$t$—time variable.

The instantaneous phase angle of the transmitter 14 at station 12 is assumed to be $$2\pi ft$$

Travelling the distance $r$ to station 10 the phase angle of the transmitter 14 becomes $$2\pi ft-2\pi f\frac{r}{c}$$

The instantaneous phase angle of transmitter 14 at station 10 will be $$2\pi(2f+f^1)t+\text{constant}$$

The phase angle at station 10 of the incidental oscillator radiation from transmitter 20 will be $$2\pi\left(f-\frac{f^1}{2}\right)t+\text{constant}$$

The receiver 16 detects a hetrodyne which has a phase angle equal to the difference of the phase angles of the two incident radio frequencies or $$2\pi\left(f+\frac{f^1}{2}\right)t-2\pi ft+2\pi\frac{fr}{c}+\text{constant}$$

$$=2\pi\frac{(f^1)}{2}t+2\pi\frac{r}{c}+\text{constant}$$

The heterodyne is transmitted back over the relay link from transmitter 24 to receiver 26 a distance $r$ as modulation on the carrier $f_1$. Accordingly, the phase angle at receiver 26 is $$2\pi\frac{(f^1)}{2}t+2\pi\frac{fr}{c}-2\pi\frac{(f^1)}{2}\frac{r}{c}+\text{constant}$$

The doubler circuit 30 now doubles the phase angle as well as the frequency so that at phasemeter 3 the phase angle becomes $$2\pi f^1t+2\pi(2f)\frac{r}{c}-2\pi f^1\frac{r}{c}+\text{constant}$$

The radiation $2f+f^1$ from transmitter 20 in travelling the distance $r$ to station 12 develops a phase angle of $$2\pi(2f+f^1)t-2\pi(2f+f^1)\frac{r}{c}+\text{constant}$$

The small amount of second harmonic radiated by the transmitter 14 will have a phase angle at receiver 18 of $$2\pi(2f)t+\text{constant}$$

The receiver 18 will accordingly detect a heterodyne having a phase angle equal to the difference between the second harmonic radiation from transmitter 14 and the $2f+f^1$ radiation from transmitter 20 to station 10. This phase angle is $$2\pi(2f+f^1)t-2\pi(2f+f^1)\frac{r}{c}-2\pi(2f)t+\text{constant}$$

$$=2\pi f^1t-2\pi(2f+f^1)\frac{r}{c}+\text{ constant}$$

This is applied over line 32 to the other side of phasemeter 34. Accordingly, the phase difference is indicated directly and can be written $$\phi=2\pi f^1t+2\pi(2f)\frac{r}{c}-2\pi f^1\frac{r}{c}-\left[2\pi f^1t-2\pi(2f+f^1)\frac{r}{c}\right]+\text{constant}$$

$$=4\pi(2f)\frac{r}{c}+\text{constant}$$

The constant in the above equation is simply the algebraic sum of all constant phase shifts throughout the system and can be made exactly zero by resetting the phasemeter dial to read zero when distance $r$ is zero. Then the phasemeter will read $$\phi=8\pi\frac{fr}{c}=8\pi\frac{r}{\lambda}$$

which in degrees is $$\phi\text{ (degrees)}=360°\frac{xr}{\lambda/4}$$

From the foregoing it will be observed that a 360° rotation of the phasemeter is equal to a change in range of $$\frac{W}{4}$$

and that the percentage error in $r$ due to frequency drift is directly proportional to the percentage drift in frequency $f$ of transmitter 14.

It will particularly be noted that $r$ is not affected by drift in the transmitter at station 12.

Figure 2:
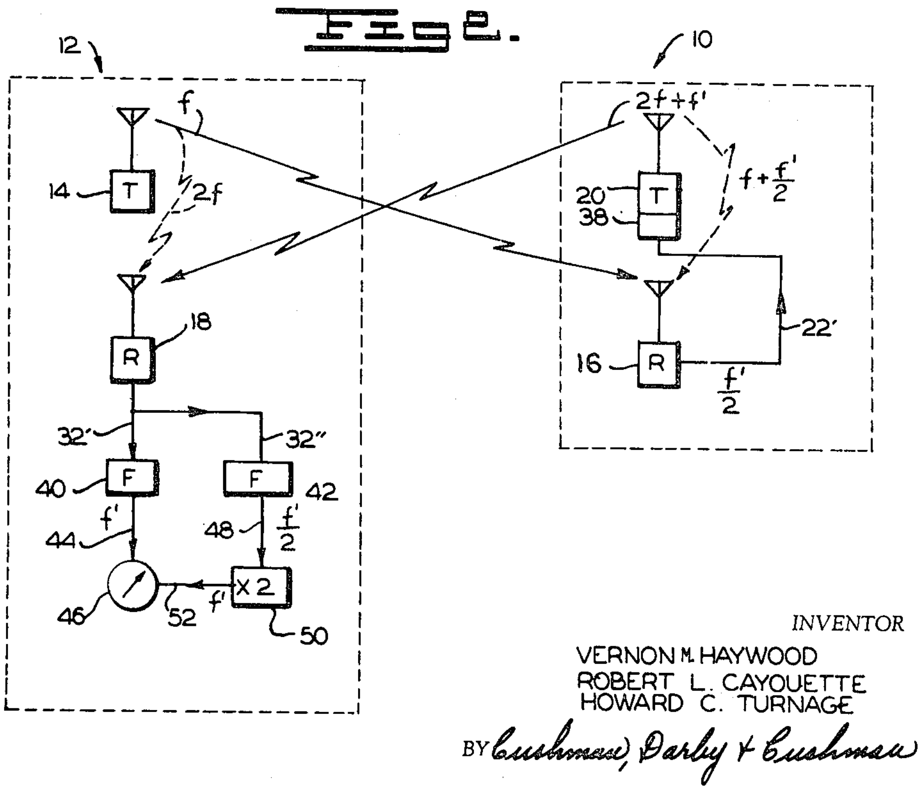
Figure 2 shows a system according to the invention in which one of the ranging frequencies is employed as a return link for relaying a detected beat frequency back to one of the stations.

Referring now to Figure 2, a system similar to that in Figure 1 is shown except that the return link between transmitter 24 and receiver 26 in Figure 1 is eliminated by use of one of the basic frequencies using a carrier. In Figure 2 reference characters similar to those in Figure 1 are used wherever possible. In the system of Figure 2, the frequency $$\frac{f^1}{2}$$

available at the receiver 24 at station 10 is applied over line 22′ to a modulating circuit 38 which impresses $$\frac{f^1}{2}$$

as a modulation frequency on the transmission $2f+f^1$ which is received by receiver 18 at station 12. The output of receiver 18 is applied over lines 32′ and 32″ to filtering circuits 40, 42, respectively. Filter 40 may be arranged to pass only frequency $f^1$ and filter 42 may pass only frequency $$\frac{f^1}{2}$$

The frequency $f^1$ passing filter 40 may be applied over line 44 to one side of an integrating phasemeter 46 and the frequency $$\frac{f^1}{2}$$

passing filter 42 may be applied over line 48 to a frequency doubling circuit 50. Accordingly, frequency $f^1$ will appear at the output of doubler circuit 50 and may be applied over line 52 to the other side of phasemeter 46. It will be clear from the foregoing that the same operation is realized at phasemeter 46 as is the case with the system of Figure 1, but with the advantage that the relay return link at frequency $f_1$ is eliminated.

In the systems of Figures 1 and 2, tracking cannot be started at an unknown point because "lane" ambiguities will be present. However, once started a record of position may be maintained by use of integrating phasemeters and/or pen recorders.

Figure 3:
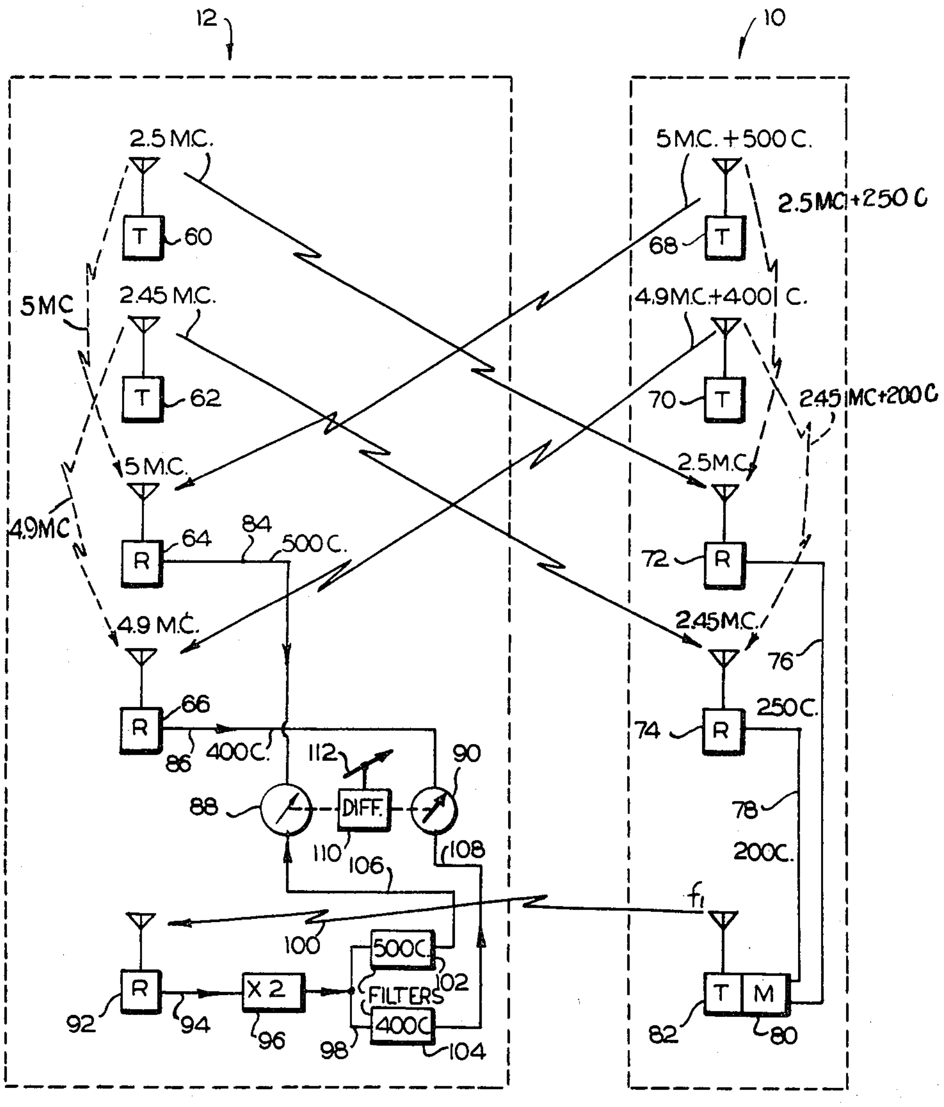
Figure 3 shows a system according to the present invention for providing a means of positive lane identification.

Referring now to Figure 3, lane identification can be directly obtained without ambiguity at any random point by using two complete systems operating on slightly different basic frequencies. To best explain this system the description will proceed with specific examples of usable frequencies. However, no limitation to these frequencies is intended.

In Figure 3 at station 12 the transmitter 60 may operate at 2.5 mc. and a transmitter 62 may operate at 2.45 mc. Also, at station 12 is a receiver 64 tuned to 5 mc. and a receiver 66 tuned to 4.9 mc.

At station 10 a transmitter 68 operates at 5 mc.+500 c. and transmitter 70 operates at 4.9 mc.+400 c. Also, at station 10 receiver 72 is tuned to 2.5 mc. and receiver 74 is tuned to 2.49 mc.

The result of the foregoing, as indicated by the transmission lanes in Figure 3, is that, at station 10 the output of receiver 72 on line 76 is a heterodyne signal at 250 c. and the output from receiver 74 on line 78 is a 200 c. heterodyne signal. These heterodyne signals on lanes 76 and 78 are applied to a modulating circuit 80 which modulates a return link transmitter 82 which operates on any convenient return link frequency $f_1$.

At station 12 the output of receiver 64 on line 84 is a 500 c. heterodyne signal and the output of receiver 66 on line 86 is a 400 c. heterodyne signal. Line 84 carrying the 500 c. signal is applied to one side of a phasemeter 88 and line 86 carrying the 400 c. signal is applied to one side of an indicating phasemeter 90.

The return link frequency $f_1$ is received at receiver 92 and the frequencies derived from receiver 92 appearing on line 94 are doubled in doubler circuit 96 and then applied over lines 98 and 100 to bandpass filters 102 and 104, respectively. Filter 102 may be arranged to pass only 500 cycle signals and filter 104 pass only 400 cycle signals. The output of filter 102 is applied over line 106 to the second input of phasemeter 88 and the output of filter 104 is applied over line 108 to the second input of phasemeter 90.

The phasemeters 88 and 90 may be interconnected with a simple differential gear device 110 which may be provided with a pointer 112 for indicating the lane in which the opposite station (in this case station 10) is located.

In operation, it may be considered that when the phasemeter 88 operating in the 5 mc. system makes 50 revolutions, for example, the phasemeter 90 operating in the 4.9 mc. system makes 49 revolutions, etc. Accordingly, the difference between the two phasemeter readings may be used as a direct indication of the lane from zero to fifty in which station 10 is located. In other words, if the system is turned on with station 12 in an unknown lane, the phasemeters will indicate a differential which will not be the same for any other lane. The number of lanes which can be accommodated will depend on the operating frequencies.

In any of the foregoing systems it will be understood that with the use of conventional phasemeters alone a continuous track of phase change may be made by use of a pen recorder.

It is of considerable interest and importance to note that in the above systems any drift of the transmitter at station 10 is of no importance. In other words, the basic frequencies of the two transmitters need not be true harmonics and need not be directly synchronized as is required in some types of radio ranging systems.

It is further of interest that the transmitters employed may be of entirely conventional construction. The second harmonic and the sub-harmonic radiated by the transmitter as above described are purely incidental. Neither is radiated with enough power in ordinary usage to violate any broadcasting regulations.

It is further to be noted that the desired harmonics produced by the transmitters need not be transmitted through space. That is, as above mentioned, the receiver and transmitter may be coupled to a common antenna.

Although in the foregoing descriptions two frequencies having an approximate ratio of 2 to 1 have been described, other ratios can be used equally well, such as 3 to 1, and 4 to 1. Also, more complex ratios such as 2 to 3, 3 to 4 and 3 to 5 can be used. However, these systems would require special transmitters and would be undesirable for that reason.

It will be understood that the above detailed description has been made only for purposes of illustration and is not intended to limit the scope of the invention. On the contrary, the scope of the invention is to be determined from the appended claims.

We claim:

1. A radio ranging system comprising a first station and a second station, a first transmitting means and a first receiving means located at the first station, a second transmitting means and a second receiving means located at the second station, the first transmitting means being adapted for operation at a first frequency and arranged to produce at least a limited amount of signal at a second frequency related to the first frequency, the second transmitting means being adapted to operate substantially at the said second frequency but differing therefrom by a relatively low frequency and arranged to produce at least a limited amount of signal at a third frequency related to the second frequency together with the low frequency, the first receiver being adapted to heterodyne the signal of second frequency from the first transmitting means and the transmission from the second transmitter to produce a first beat signal at the said low frequency, the second receiver being adapted to heterodyne the transmission from the first transmitter and the signal of said third frequency received from the second transmitter to produce a second beat signal, frequency altering means for causing the said first and second beat signals to correspond in frequency, means for relaying the beat signals to a common location, and means at the common location for comparing the phase angles of the beat signals to determine the spacing between the first and second stations, the system further including a third transmitting means and a third receiving means at the first station and a fourth transmitting means and a fourth receiving means at the second station, the third and fourth transmitting and receiving means being adapted for operation as a unit with the unit comprising the first and second transmitting and receiving means but at a different set of frequencies, and means for comparing the beat frequency phase angles of each of the systems as detected at the common location for directly determining the spacing between the first and second stations in terms of the number of radio frequency wave lengths between the first and second stations.

2. A system as in claim 1 in which the means for comparing the said phase angles of the two units comprises a differential device connected between the phase angle determining means of each unit.

3. A radio ranging system comprising a first station and a second station, first and third transmitting means and first and third receiving means located at the first station, second and fourth transmitting means and second and fourth receiving means located at the second station, the first and second transmitting means being tuned to operate at first frequencies differing by a first relatively low frequency, the third and fourth transmitting means being tuned to operate at second frequencies differing by a second relatively low frequency, the first and second receivers being tuned to detect a beat signal of said first low frequency, means for determining the phase angle between the beat signal of said first low frequency, the third and fourth receivers being tuned to detect beat signals of said second low frequency, means for determining the phase angle between the beat signals of said second low frequency, and differential means connected with the first and second phase determining means for indicating directly without ambiguity the distance of the second station from the first station.

4. A radio ranging system comprising a first station and a second station, first and third transmitting means and first and third receiving means located at the first station, second and fourth transmitting means and second and fourth receiving means located at the second station, the first and second transmitting means being tuned to operate at first frequencies differing by a first relatively low frequency, the third and fourth transmitting means being tuned to operate at second frequencies differing by a second relatively low freqeuncy, the first and second receivers being tuned to detect a beat signal of said first low frequency, means for determining the phase angle between the beat signal of said first low frequency, the third and fourth receivers being tuned to detect beat signals of said second low frequency, means for determining the phase angle between the beat signals of said second low frequency for indicating directly without ambiguity the distance of the second station from the first station.

No references cited.